Figures 1, 2:
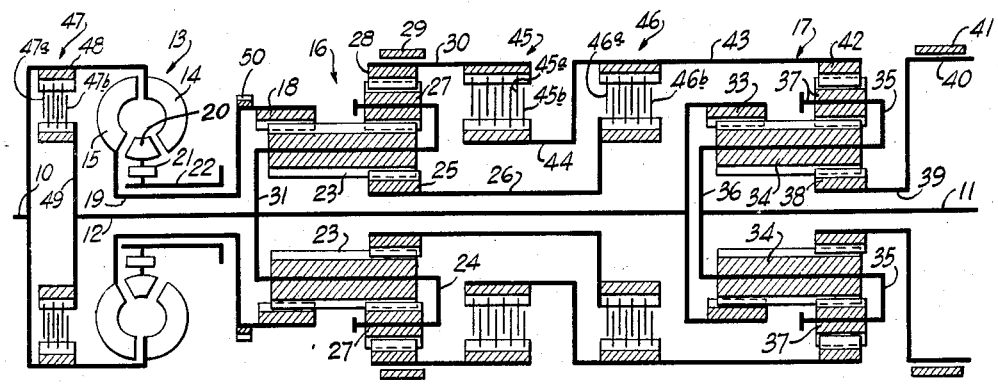

July 14, 1959   J. A. MILLER   2,894,415
FIVE SPEED PLANETARY TRANSMISSION
Filed Dec. 31, 1956

|  | 29 | 45 | 46 | 41 | 47 |
|---|---|---|---|---|---|
| REVERSE | ● |  | ● |  |  |
| FIRST | ● | ● |  |  |  |
| SECOND | ● |  |  | ● |  |
| THIRD |  |  | ● | ● |  |
| FOURTH |  |  |  | ● | ● |
| FIFTH |  | ● |  |  | ● |

INVENTOR
JAMES A. MILLER
BY
*J. Frederick Bechtel*
ATTORNEY

United States Patent Office 2,894,415
Patented July 14, 1959

2,894,415

FIVE SPEED PLANETARY TRANSMISSION

James A. Miller, Battle Creek, Mich., assignor to Clark Equipment Company, a corporation of Michigan Application December 31, 1956, Serial No. 631,805

11 Claims. (Cl. 74—688)

This invention relates generally to multispeed transmissions and, more particularly, to five speed planetary transmissions of the type especially well suited for use in trucks and other similar heavy duty vehicles.

The invention has for its principal object the provision of an improved transmission characterized by simple, compact construction with the attendant advantages relative to economy of construction and simplicity of installation and maintenance.

It is also an object of this invention to provide an improved transmission having five forward speed drive ratios and one reverse speed with all ratios being effected by the engagement of controllable friction devices whereby a change of speed ratio may be accomplished without interrupting the flow of torque from the vehicle engine.

It is a further object of the present invention to provide an improved transmission employing two band brakes and three multiple-disk friction clutches which are arranged to be actuated in different pairs in order to complete the aforementioned five forward speed ratios and the reverse drive.

Another and more specific object of the present invention is to provide a multispeed transmission of the character indicated above employing a pair of double pinion type planetary gear sets connected in series and so interrelated that at least two of the higher forward speed ratios are obtained by actuating a friction type clutch which bypasses the input gear set and also bypasses a torque converter of the type conventionally employed to drive the input gear set.

A further object of the present invention is the provision of an improved transmission employing two double pinion type planetary gear sets so arranged and interconnected that the aforementioned five forward speed ratios and the reverse drive may be effected together with bypass of the torque converter at higher forward speed ratios while at the same time employing a minimum number of the aforementioned band brakes and friction clutches.

The invention, both as to its organization and manner of operation, together with further objects and advantages thereof, will best be understood by reference to the specification taken in conjunction with the accompanying drawing wherein:

Fig. 1 is a diagrammatic view illustrating a transmission characterized by the features of the present invention; and Fig. 2 is a table showing the various pairs of controllable friction devices which are engaged to complete the different drive ratios through the transmission.

In accordance with the present invention, the foregoing and other objects are realized by providing a transmission including two double pinion type planetary gear sets and a torque converter connected between an engine shaft driven from the engine of the vehicle and the output shaft of the transmission. A first input element of the first gear set is connected to the turbine of the torque converter to provide input power to the first set while a second element of the first set is connected to an intermediate shaft which also carries a first input element of the second gear set. A band brake associated with the input gear set provides major reduction therein while a first multiple-disk friction clutch may be selectively actuated to connect one of the elements of the output gear set (the second input element) to this same band brake to provide a major reduction in the latter gear set. This clutch also serves to lock up the two gear sets during direct drive. A band brake associated with the output gear set provides minor speed reduction therein. The input gear set also includes an output element which is adapted to be connected through a second multiple-disk friction clutch to the second input element of the output gear set, thereby to provide a dual path of power flow between the two gear sets. A third friction type clutch is adapted to connect the engine shaft directly to the intermediate shaft in order to bypass both the torque converter and the input gear set for at least the two highest speed ratios. As previously indicated, the two described band brakes and the three friction clutches may be selectively actuated in different pairs in order to provide five forward speed ratios and a reverse drive through the transmission.

Referring now to the drawings, and more particularly to Fig. 1, there is disclosed a mechanism for transferring drive from an engine shaft 10 to a driven shaft 11 by way of an intermediate shaft 12 axially aligned with and disposed between the engine and driven shafts. As is illustrated in Fig. 1, the engine shaft 10 is directly connected to the impeller 14 of a torque converter 13. The output shaft 11 is, of course, adapted to be connected through conventional differential gearing and other suitable connecting means to the wheels of the vehicle.

As is customary in transmissions of the type illustrated, the shafts 11 and 12 have telescoping end portions and are journaled within a suitable transmission casing not shown in the drawings. This casing also houses a pair of similar gear sets 16 and 17 connected in tandem between the engine and driven shafts, each set consisting of a double pinion type planetary gearing.

The planetary gear set 16 has an input ring gear 18 which is carried upon an elongated sleeve portion 19 rotatably supported about the input end of intermediate shaft 12. In order to transfer the drive from the engine shaft 10 to the ring gear 18, the sleeve portion 19, hereinafter sometimes referred to as the input shaft, is secured to the turbine 15 of the torque converter 13. The latter torque converter, of course, also includes reaction blades 20 which are connected through a one-way brake 21 to fixed structure 22 of the transmission casing.

The gear set 16, in addition to the ring gear 18, comprises a plurality of elongated planet pinions 23 spaced equal distances apart and rotatably mounted upon a planet carrier 24, with three such pinions preferably being provided. Each of the pinions 23, of course, meshes with the ring gear 18 and with a sun gear 25 secured to an elongated sleeve 26 encircling and mounted for rotation about the intermediate shaft 12. The elongated pinions 23 also mesh with a plurality of relatively short pinions 27 spaced equal distances apart and rotatably mounted upon the planet carrier 24. The short pinions 27 in turn mesh with a ring gear 28 carried upon an annular brake drum 30 which may be held stationary by a fluid operated band brake 29 in order to provide torque reaction for the input gear and establish a major speed reduction therein.

The planet carrier 24 includes an integral extension 31 which is splined to the intermediate shaft 12 for the purpose of providing drive for an input ring gear 33 of the gear set 17. The latter ring gear is, of course, suitably splined to the shaft 12 and meshes with a plurality of equally spaced, elongated pinions 34 rotatably supported upon a planet carrier 35. The carrier 35 is provided with an integral portion 36 splined to the output shaft 11 in order to complete the drive to the latter shaft from the output gear set 17. The elongated pinions 34 mesh with relatively short pinions 37 rotatably supported upon the planet carrier 35 and also with a sun gear 38 secured to a sleeve 39 which is mounted for rotation about the output shaft 11. The sleeve 39 is formed integral with an annular drum 40 which may be held stationary by means of a fluid operated band brake 41 in order to provide torque reaction for the output gear set 17 and establish a minor speed reduction therein.

The short pinions 37 also mesh with a ring gear 42 attached to an elongated drum 43 encircling the gear set 17 and including an integral extension sleeve 44. A fluid operated multiple-disk friction clutch 45 is disposed between the sleeve 44 and the brake drum 30 while a second similar clutch 46 is adapted to connect the drum 43 and the sleeve 26. The clutch 45 is of conventional construction and has a plurality of interleaved clutch plates 45a and 45b respectively carried by the drum 30 and by the sleeve 44. The plates of the clutch 45 are disposed between an annular backing plate secured to the clutch housing and an annular piston (not shown) longitudinally movable within the housing. Suitable biasing springs (not shown) acting against the piston normally maintain the clutch plates in disengaged position. Application of fluid pressure to the face of the clutch piston moves the clutch plates 45a and 45b into frictional engagement whereupon the ring gear 28 of the input gear set 16 is connected to the ring gear 42 of the output gear set.

As previously mentioned, the clutch 46 is similar to the clutch 45 just described and includes interleaved plates 46a and 46b respectively carried by the drum 43 and the sleeve 26 which plates are adapted to be moved into frictional engagement by introduction of fluid to the clutch piston (not shown).

In accordance with an important feature of the present invention, a third fluid operated, friction type clutch indicated at 47 is adapted to connect the engine shaft 10 directly to the intermediate shaft 12 in the two highest speed ratios. To this end, one set of plates 47a of the clutch 47 is carried upon structure 48 secured to the engine shaft 10 and a second set of plates 47b is carried upon structure 49 secured to the intermediate shaft 12. When fluid is admitted to the piston of clutch 47 to force the interleaved plates 47a and 47b into engagement, the engine shaft 10 is connected through shaft 12 to the ring gear 33 of the output gear set 17, thereby bypassing both the torque converter 13 and the input gear set 16. As will be understood by those skilled in this art, bypassing of the torque converter at high speeds avoids torque converter losses and, hence, increases the efficiency of operation of the transmission in the speed ratios most commonly used in long distance hauls.

The transmission casing also encloses a front and rear pumps (not shown) of conventional construction which perform the functions of pressurizing and feeding oil to the torque converter 13, providing lubrication for the transmission gearing, for cooling the friction brakes and clutches, if necessary, and also for providing fluid pressure to engage the friction brakes and clutches.

To provide power take-off for driving auxiliary equipment on the vehicle, a reach-in type adapter may be inserted through an opening provided in the transmission casing to be driven by an externally toother portion 50 of the ring gear 18.

As previously indicated, the transmission of the present invention is particularly well suited for use on trucks or heavy duty vehicles and, to this end, provides a neutral condition, together with five forward speed drive ratios and a single reverse drive. The transmission may be operated either automatically or manually by simultaneously applying different pairs of the clutches and brakes. For automatic operation the clutches 45, 46 and 47 and the brakes 29 and 41 may be operated by the selective application of hydraulic pressure from any suitable control mechanism, as will be readily understood by those skilled in this art.

In neutral condition all three of the clutches and both of the brakes are disengaged, whereupon torque will be transmitted from the vehicle engine through the shaft 10 and the torque converter 13 to the input shaft or sleeve 19, thereby to effect rotation of the ring gear 18 of the input gear set 16 and also to drive the power takeoff gear 50. No torque is transmitted to the driven shaft 11 in view of the absence of reaction elements in both of the gear sets 16 and 17 and no torque is transmitted to the intermediate shaft 12 since the clutch 47 is not actuated.

As will be apparent from a study of the table shown in Fig. 2, the first forward speed ratio is established by simultaneously applying the brake 29 and the clutch 45 thereby holding both of the ring gears 28 and 42 stationary in order to effect major speed reductions in both the input and output gear sets. It will be understood that, at this time, the brake 41 and the clutches 46 and 47 are not engaged. Rotation of the input shaft 19 and the ring gear 18 then causes the drive to pass through the planet pinions 23, through the planet carrier 24, and through the intermediate shaft 12 to the ring gear 33 of the output planetary gear set 17. Power then flows from the ring gear 33 to the planet pinions 34 and then to the planet carrier 35 which is attached to the driven shaft 11.

The second forward speed ratio is obtained by releasing the clutch 45 and applying the band brake 41 while holding the brake 29 applied. Release of clutch 45, of course, frees the ring gear 42 for rotation while application of the brake 41 places the output gear group in minor speed reduction by holding sun gear 38 stationary. The input gear group, of course, remains in major reduction.

The third forward speed ratio is obtained by releasing the brake 29 and actuating the clutch 46, while at the same time holding the brake 41 applied. With the clutch 46 applied, the sun gear 25 of the input gear set 16 receives the reaction of the output gear set which obviously remains in minor reduction. Under these conditions, a dual path of power flow is effected between the gear sets, the first such path being from the ring gear 18 through the planet pinions 23 and the planet carrier 24 to the ring gear 33 and the second such path being from the ring gear 18 through the planet pinions 23 and sun gear 25 and to the ring gear 42.

To provide the fourth forward speed ratio the brake 41 remains applied, while the clutch 46 is released and the clutch 47 is actuated. Under these conditions, the engine shaft 10 is connected through clutch 47 and through intermediate shaft 12 to drive the ring gear 33 of the output gear set 17 which is, at this time, in minor speed reduction. Both the torque converter 13 and the input gear set 16 are bypassed by the clutch 47.

The fifth forward speed drive is obtained by releasing the brake 41 and applying the clutch 45, while maintaining the clutch 47 in energized condition. With the clutches 45 and 47 applied, the gear sets 16 and 17 are both locked and a direct drive is provided from the engine shaft 10 to the output shaft 11.

Reverse drive is effected by simultaneously applying the clutch 46 and the band brake 29. As indicated above, major speed reduction is provided in the input gear set 16 with the brake 29 applied. With the clutch 46 applied, the sun gear 25 of the set 16 is connected to drive the ring gear 42 of the set 17, with the result that a dual path of power flow from the input gear set is again provided. The first such path of power flow passes from the ring gear 18 and the planet pinions 23 to the carrier 24 connected to the intermediate shaft 12, while the second path includes the ring gear 18, the pinions 23, the sun gear 25, the clutch 46 and the ring gear 42. The output planetary gear set 17 functions to recombine these two paths of power flow and produces a reverse drive of the driven shaft 11.

In view of the foregoing description it will be recognized that the transmission of the present invention provides five forward speed ratios and a reverse drive between the engine shaft and the output shaft, with each of these drives being effected by the simultaneous application of a pair of controllable friction devices. Moreover, it will be recognized that the transition from first to fifth speed in each ratio is effected by releasing only one of the controllable devices of each pair, thereby preventing the interruption of torque from the driven shaft 11.

While a particular embodiment of the invention has been shown, it will be understood, of course, that the invention is not limited thereto, since many modifications may be made, and it is therefore contemplated by the appended claims to cover any such modifications as fall within the true spirit and scope of the invention.

What is claimed as new and desired to be secured by Letters Patent of the United States is:

1. In a multispeed transmission, the combination of an engine shaft, an output shaft, an intermediate shaft disposed between said engine and output shafts, a torque converter including an impeller driven by said engine shaft and a turbine driving an input shaft, a first planetary gearing having a plurality of elements including an input element driven by said input shaft, at least one reaction element and an output element, a second planetary gearing having at least four elements including an output element connected to drive said output shaft, at least one reaction element, and at least one input element, the output element of said first gearing and the said input element of said second gearing being secured to said intermediate shaft, means including a first friction device for connecting said engine shaft directly to said intermediate shaft to bypass both the torque converter and the first gearing, means including at least four additional friction devices for cooperating with said first and second gearings to provide different speed ratios, the five friction devices being selectively operable in different pairs to provide at least five forward speed drive ratios and a reverse drive between said engine and output shafts, the highest forward speed ratio being effected by actuating said first friction device to drive the input element of the second gearing directly from said engine shaft and by also actuating one of said four additional friction devices to provide a direct drive from the intermediate shaft to the output shaft, and the second highest ratio being provided by actuating said first friction device to provide a direct drive from said engine shaft to said intermediate shaft and by also actuating another of said four additional friction devices to hold the said reaction element of the second gearing in order to provide a speed reduction between the intermediate shaft and the output shaft.

2. In a multispeed transmission, the combination of an engine shaft, an output shaft, an intermediate shaft disposed between said engine and output shafts, a torque converter including an impeller driven by said engine shaft and a turbine driving an input shaft, a first planetary gearing having a plurality of elements including an input element driven by said input shaft, at least one reaction element and first and second output elements, a second planetary gearing having a plurality of elements including an output element connected to drive said output shaft, at least one reaction element, and first and second input elements, the first output element of said first gearing and the first input element of said second gearing being secured to said intermediate shaft, means including a first friction device for connecting said engine shaft directly to said intermediate shaft to bypass both the torque converter and the first gearing, means including at least four additional friction devices for cooperating with said first and second gearings to provide different speed ratios, at least one of said additional devices being a friction clutch for connecting the second output element of the first gearing to the second input element of the second gearing, the five friction devices being selectively operable in different pairs to provide at least five forward speed drive ratios and a reverse drive between said engine and output shafts, the highest forward speed ratio being effected by actuating said first friction device to drive the first input element of the second gearing directly from said engine shaft and by also actuating one of said four additional friction devices to provide a direct drive from the intermediate shaft to the output shaft, and the second highest ratio being provided by actuating said first friction device to provide a direct drive from said engine shaft to said intermediate shaft and by also actuating another of said four additional friction devices to hold one of the reaction elements of the second gearing in order to provide a speed reduction between the intermediate shaft and the output shaft.

3. In a multispeed transmission, the combination of an engine shaft, an output shaft, an intermediate shaft disposed between said engine and output shafts, a torque converter including an impeller driven by said engine shaft and a turbine driving an input shaft, a first planetary gearing having a plurality of elements including an input element driven by said input shaft, at least one reaction element and first and second output elements, a second planetary gearing having a plurality of elements including an output element connected to drive said input shaft, at least one reaction element, and first and second input elements, the first output element of said first gearing and the first input element of said second gearing being secured to said intermediate shaft, means including a first friction device for connecting said engine shaft directly to said intermediate shaft to bypass both the torque converter and the first gearing, means including a second friction device for connecting the second output element of the first gearing to the second input element of the second gearing, means including a third friction device for holding the reaction element of the second gearing, means including fourth and fifth friction devices cooperating with said first and second gearings and with said first, second and third friction devices to provide different speed ratios, the five friction devices being selectively operable in different pairs to provide at least five forward speed drive ratios and a reverse drive between said engine and output shafts, the highest forward speed ratio being effected by actuating said first friction device to drive the first input element of the second gearing directly from said engine shaft and by also actuating one of the other friction devices to provide a direct drive from the intermediate shaft to the output shaft, and the second highest ratio being provided by actuating said first friction device to provide a direct drive from said engine shaft to said intermediate staft and by also actuating the third friction device to hold the reaction element of the second gearing in order to provide a speed reduction between the intermediate shaft and the output shaft.

4. In a multispeed transmission, the combination of an engine shaft, an output shaft, an intermediate shaft disposed between said engine and output shafts, a torque converter including an impeller driven by said engine shaft and a turbine driving an input shaft, a first planetary gearing having a plurality of elements including an input element driven by said input shaft, at least one reaction element and first and second output elements, a second planetary gearing having a plurality of elements including an output element connected to drive said output shaft, first and second reaction elements, and an input element, the first output element of said first gearing and the input element of said second gearing being secured to said intermediate shaft, means including a first friction device for connecting said engine shaft directly to said intermediate shaft to bypass both the torque converter and the first gearing, means including a second friction device for connecting the first reaction element of the second gearing to the second output element of the first gearing, a third friction device for holding the reaction element of the first gearing, means including a fourth friction device for holding the second reaction element of the second gearing and a fifth friction device associated with the first reaction element of the second gearing, the five friction devices being selectively operable in different pairs to provide at least five forward speed drive ratios and a reverse drive between said engine and output shafts, the highest forward speed ratio being effected by actuating said first friction device to drive the input element of the second gearing directly from said engine shaft and by also actuating one of the other friction devices to provide a direct drive from the intermediate shaft to the output shaft, and the second highest ratio being provided by actuating said first friction device to provide a direct drive from said engine shaft to said intermediate shaft and by also actuating said fourth friction device to hold the second reaction element of the second gearing in order to provide a speed reduction between the intermediate shaft and the output shaft.

5. A multiple speed transmission for heavy vehicles comprising an engine shaft, an output shaft, an intermediate shaft disposed between the engine and output shafts, a torque converter including an impeller driven from said engine shaft and a turbine connected to drive an input shaft, first and second planetary gearings connected in tandem between said input and output shafts, the first planetary gearing including an input element secured to said input shaft, a first output element secured to said intermediate shaft, a second output element, and a first reaction element, means including a first friction device to hold said first reaction element stationary to provide a speed reduction in the first gearing, the second gearing including an input element secured to the intermediate shaft, an output element secured to said output shaft and first and second reaction elements, means including a second friction device to hold the first reaction element of the second gearing, means including a third friction device connecting the second reaction element of the second gearing to the reaction element of the first gearing, means including a fourth friction device connecting the second reaction element of the second gearing to the second output element of the first gearing, means including a fifth friction device for connecting the engine shaft directly to said intermediate shaft to bypass both the first gearing and the torque converter, said five fiction devices being engageable in different pairs to provide five forward speed ratios and a reverse drive between said engine shaft and said output shaft.

6. A multiple speed transmission for heavy vehicles comprising an engine shaft, an output shaft, an intermediate shaft disposed between the engine and output shafts, a torque converter including an impeller driven from said engine shaft and a turbine connected to drive an input shaft, first and second planetary gearings connected in tandem between said input and output shafts, the first planetary gearing including an input element secured to said input shaft, a first output element secured to said intermediate shaft, a second output element, and a first reaction element, means including a first friction device to hold said first reaction element stationary to provide a major speed reduction in the first gearing, the second gearing including an input element secured to the intermediate shaft, an output element secured to said output shaft and first and second reaction elements, means including a second friction device to hold the first reaction element of the second gearing in order to provide a minor speed reduction in the second gearing, means including a third friction device connecting the second reaction element of the second gearing to the reaction element of the first gearing, means including a fourth friction device connecting the second reaction element of the second output element of the first gearing, means including a fifth friction device for connecting the engine shaft directly to said intermediate shaft to bypass both the first gearing and the torque converter, said five friction devices being engageable in different pairs to provide five forward speed ratios and a reverse drive between said engine shaft and said output shaft, the first forward speed ratio being provided by simultaneous engagement of said first and third friction devices to effect major speed reductions in both the first and second gearings, the second ratio being provided by simultaneous engagement of said first and second friction devices to provide major reduction in the first gearing and minor reduction in the second gearing, the third ratio being obtained by simultaneous engagement of said second and fourth friction devices to obtain a split flow of power between said first and second gearings, the fourth ratio being obtained by simultaneous engagement of said second and fifth friction devices, the fifth ratio being a direct drive from the engine shaft to the output shaft provided by simultaneous engagement of said third and fifth friction devices, and the reverse drive being obtained by simultaneous engagement of said first and fourth friction devices to provide a split flow of power between the first and second gearings.

7. A multiple speed transmission for heavy vehicles comprising an engine shaft, an output shaft, an intermediate shaft disposed between the engine and output shafts, a torque converter including an impeller driven from said engine shaft and a turbine connected to drive an input shaft, first and second compound, double pinion type planetary gearings connected in tandem between said input and output shafts, the first planetary gearing including an input element secured to said input shaft, a pair of pinions meshing with each other and carried upon a planet carrier, one of said pinions meshing with said input element and with a first reaction element and the other of said pinions meshing with an output element, said planet carrier being secured to said intermediate shaft, means including a first brake to hold said output element stationary to provide a speed reduction in the first gearing, the second gearing including an input element secured to the intermediate shaft, a pair of meshing pinions mounted upon a planet carrier, one of said last named pinions meshing with the input element of the second gearing and with a first reaction element and the other of said last named pinions meshing with a second reaction element, the planet carrier of the second gearing being secured to said output shaft, means including a second brake to hold the first reaction element of the second gearing in order to provide a speed reduction in the second gearing, means including a first clutch connecting the second reaction element of the second gearing to the output element of the first gearing, means including a second clutch connecting the second reaction element of the second gearing to the first reaction element of the first gearing, means including a third clutch for connecting the engine shaft directly to said intermediate shaft to bypass both the first gearing and the torque converter, said two brakes and three clutches being engageable in different pairs to provide at least five forward speed ratios and a reverse drive between said engine shaft and said output shaft.

8. A multiple speed transmission for heavy vehicles comprising an engine shaft, an output shaft, an intermediate shaft disposed between the engine and output shafts, a torque converter including an impeller driven from said engine shaft and a turbine connected to drive an input shaft, first and second compound, double pinion type planetary gearings connected in tandem between said input and output shafts, the first planetary gearing including an input element secured to said input shaft, a pair of pinions meshing with each other and carried upon a planet carrier, one of said pinions meshing with said input element and with a first reaction element and the other of said pinions meshing with an output element, said planet carrier being secured to said intermediate shaft, means including a first brake to hold said output element stationary to provide a major speed reduction in the first gearing, the second gearing including an input element secured to the intermediate shaft, a pair of meshing pinions mounted upon a planet carrier, one of said last named pinions meshing with the input element of the second gearing and with a first reaction element and the other of said last named pinions meshing with a second reaction element, the planet carrier of the second gearing being secured to said output shaft, means including a second brake to hold the first reaction element of the second gearing in order to provide a minor speed reduction in the second gearing, means including a first clutch connecting the second reaction element of the second gearing to the output element of the first gearing, means including a second clutch connecting the second reaction element of the second gearing to the first reaction element of the first gearing, means including a third clutch for connecting the engine shaft directly to said intermediate shaft to bypass both the first gearing and the torque converter, said two brakes and three clutches being engageable in different pairs to provide five forward speed ratios and a reverse drive between said engine shaft and said output shaft, the first forward speed ratio being provided by simultaneous engagement of said first brake and said first clutch to effect major speed reductions in both the first and second gearings, the second ratio being provided by simultaneous engagement of said first and second brakes to provide major reduction in the first gearing and minor reduction in the second gearing, the third ratio being obtained by simultaneous engagement of said second brake and said second clutch to obtain a split flow of power between said first and second gearings, the fourth ratio being obtained by simultaneous engagement of said third clutch and said second brake, the fifth ratio being a direct drive from the engine shaft to the output shaft provided by simultaneous engagement of said first and third clutches, and the reverse drive being obtained by simultaneous engagement of said first brake and said second clutch to provide a split flow of power between the first and second gearings.

9. A multiple speed transmission for heavy vehicles comprising an engine shaft, an output shaft, an intermediate shaft disposed between the engine and ouput shafts, a torque converter including an impeller driven from said engine shaft and a turbine connected to drive an input shaft, first and second compound, double pinion type planetary gearings connected in tandem between said input and output shafts, the first planetary gearing including a first ring gear secured to said input shaft, a pair of pinions meshing with each other and carried upon a first planet carrier, one of said pinions meshing with said first ring gear and with a first sun gear and the other of said pinions meshing with a second ring gear, said planet carrier being secured to said intermediate shaft, means including a first brake to hold said second ring gear stationary in order to provide a major speed reduction in the first gearing, the second gearing including a third ring gear secured to the intermediate shaft, a pair of meshing pinions mounted upon a second planet carrier, one of said last named pinions meshing with said third ring gear and with a second sun gear and the other of said last named pinions meshing with a fourth ring gear, said second planet carrier being secured to said output shaft, means including a second brake to hold said second sun gear in order to provide a minor speed reduction in the second gearing, means including a first clutch connecting the fourth ring gear to the second gear, means including a second clutch connecting the fourth ring gear to the first sun gear, and means including a third clutch for connecting the engine shaft directly to said intermediate shaft to bypass both the first gearing and the torque converter, said two brakes and three clutches being engageable in different pairs to provide five forward speed ratios and a reverse drive between said engine shaft and said output shaft.

10. A multiple speed transmission for heavy vehicles comprising an engine shaft, an output shaft, an intermediate shaft disposed between the engine and output shafts, a torqu converter including an impeller driven from said engine shaft and a turbine connected to drive an input shaft, first and second compound, double pinion type planetary gearings connected in tandem between said input and output shafts, the first planetary gearing including a first ring gear secured to said input shaft, a pair of pinions meshing with each other and carried upon a first planet carrier, one of said pinions meshing with said first ring gear and with a first sun gear and the other of said pinions meshing with a second ring gear, said planet carrier being secured to said intermediate shaft, means including a first brake to hold said second ring gear stationary in order to provide a major speed reduction in the first gearing, the second gearing including a third ring gear secured to the intermediate shaft, a pair of meshing pinions mounted upon a second planet carrier, one of said last named pinions meshing with said third ring gear and with a second sun gear and the other of said last named pinions meshing with a fourth ring gear, said second planet carrier being secured to said output shaft, means including a second brake to hold said second sun gear in order to provide a minor speed reduction in the second gearing, means including a first clutch connecting the fourth ring gear to the second ring gear, means including a second clutch connecting the fourth ring gear to the first sun gear, and means including a third clutch for connecting the engine shaft directly to said intermediate shaft to bypass both the first gearing and the torque converter, said two brakes and three clutches being engageable in different pairs to provide five forward speed ratios and a reverse drive between said engine shaft and said output shaft, the first forward speed ratio being provided by simultaneous engagement of said first brake and said first clutch to effect major speed reductions in both the first and second gearings, the second ratio being provided by simultaneous engagement of said first and second brakes to provide major reduction in the first gearing and minor reduction in the second gearing, the third ratio being obtained by simultaneous engagement of said second brake and said second clutch to obtain a split flow of power between said first and second gearings, the fourth ratio being obtained by simultaneous engagement of said third clutch and said second brake, the fifth ratio being a direct drive from the engine shaft to the output shaft provided by simultaneous engagement of said first and third clutches, and the reverse drive being obtained by simultaneous engagement of said first brake and said second clutch to provide a split flow of power between the first and second gearings.

11. The transmission defined by claim 10 wherein the first ring of the first gearing includes an externally toothed portion for the purpose of providing power take-off.

References Cited in the file of this patent
FOREIGN PATENTS
1,073,045 France Mar. 17, 1954

UNITED STATES PATENT OFFICE

CERTIFICATE OF CORRECTION

Patent No. 2,894,415            July 14, 1959

James A. Miller

It is hereby certified that error appears in the printed specificatio of the above numbered patent requiring correction and that the said Letter Patent should read as corrected below.

Column 3, line 68, for "toother" read -- toothed --; column 6, line 30, for "input" read -- output --; column 9, line 52, for "includlng" read -- including --; column 10, line 14, for "torqu" read -- torque --.

Signed and sealed this 17th day of November 1959.

(SEAL)
Attest:

KARL H. AXLINE
Attesting Officer

ROBERT C. WATSON
Commissioner of Patents